United States Patent
Jeong et al.

(10) Patent No.: US 12,555,222 B2
(45) Date of Patent: Feb. 17, 2026

(54) SYSTEM AND METHOD FOR DETECTING DEFECTS

(71) Applicant: Samsung Electronics Co., Ltd., Suwon-si (KR)

(72) Inventors: Ji Seong Jeong, Suwon-si (KR); Chang Hun Ko, Suwon-si (KR); Seung Eun Yu, Suwon-si (KR); Oh Hun Kwon, Suwon-si (KR); Hyuck Joon Kwon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 588 days.

(21) Appl. No.: 17/972,107

(22) Filed: Oct. 24, 2022

(65) Prior Publication Data
US 2023/0230226 A1    Jul. 20, 2023

(30) Foreign Application Priority Data

Jan. 20, 2022 (KR) .................. 10-2022-0008540
May 11, 2022 (KR) .................. 10-2022-0057791

(51) Int. Cl.
*G06T 7/00* (2017.01)

(52) U.S. Cl.
CPC .... *G06T 7/001* (2013.01); *G06T 2207/10061* (2013.01); *G06T 2207/30148* (2013.01)

(58) Field of Classification Search
CPC .......... G06T 7/001; G06T 2207/10061; G06T 2207/30148; G06T 7/0004; G06T 7/0006; H01L 22/12; H01J 37/28; G01N 23/2251; G01N 2223/306; G01N 2223/401; G01N 2223/6116; G01N 2223/646
See application file for complete search history.

(56) References Cited

U.S. PATENT DOCUMENTS

| | | | |
|---|---|---|---|
| 7,365,322 B2 | 4/2008 | Miyamoto et al. | |
| 7,653,892 B1* | 1/2010 | Gennari | G06F 30/39 716/50 |
| 7,676,077 B2* | 3/2010 | Kulkarni | H01L 21/67005 382/145 |
| 8,285,031 B2 | 10/2012 | Kitamura et al. | |
| 8,607,169 B2 | 12/2013 | Leu | |
| 9,672,611 B2 | 6/2017 | Yang et al. | |

(Continued)

FOREIGN PATENT DOCUMENTS

| KR | 20140061506 A | 5/2014 | |
|---|---|---|---|
| KR | 20210150233 A * | 12/2021 | G06N 3/082 |

*Primary Examiner* — Samir A Ahmed
(74) *Attorney, Agent, or Firm* — Harness, Dickey & Pierce, P.L.C.

(57) ABSTRACT

A system for detecting defects includes a memory configured to store a program of instructions; and a processor configured execute the program of instructions to convert an SEM image into an image layout, determine a search space based on performing first layout matching for the image layout and a design layout, match the image layout and the design layout based on performing the second layout matching in the search space, and output defect information based on detecting defects the matched image layout and the matched design layout. The SEM image is an image obtained based on photographing a semiconductor pattern formed on a semiconductor wafer using the design layout based on using a scanning electron microscope.

17 Claims, 12 Drawing Sheets

(56) References Cited

U.S. PATENT DOCUMENTS

| | | |
|---|---|---|
| 10,445,875 B2 | 10/2019 | Toyoda et al. |
| 10,546,085 B2 | 1/2020 | Hu et al. |
| 10,922,808 B2 | 2/2021 | Brauer |
| 2007/0156379 A1* | 7/2007 | Kulkarni ........... H01L 21/67005 |
| | | 703/14 |
| 2013/0174102 A1* | 7/2013 | Leu ................. G05B 19/41875 |
| | | 716/52 |
| 2016/0358070 A1* | 12/2016 | Brothers ................ G06N 3/045 |
| 2017/0345725 A1* | 11/2017 | Hu ........................... H01L 22/12 |
| 2018/0218492 A1* | 8/2018 | Zhang ................... G06T 7/0006 |
| 2018/0300434 A1* | 10/2018 | Hu ...................... G03F 7/70508 |
| 2021/0240906 A1 | 8/2021 | Salik et al. |

\* cited by examiner

20

21

22

30

S120

| Methodology | The number of searches | TAT of test set | TAT of a data |
|---|---|---|---|
| Brute force algorithm | 40,401 | 225h | 0.15h |
| 2-steps brute force algorithm | 3,200 | 3.75h | 0.0025h |
| SGD optimizer with 2-steps | 1,630 | 2.5h | 0.0017h |
| Visual inspection | - | 25h | 0.017h |

SYSTEM AND METHOD FOR DETECTING DEFECTS

CROSS-REFERENCE TO RELATED APPLICATIONS

This application claims priorities from Korean Patent Application No. 10-2022-0008540 filed on Jan. 20, 2022 in the Korean Intellectual Property Office and Korean Patent Application No. 10-2022-0057791 filed on May 11, 2022 in the Korean Intellectual Property Office, and all the benefits accruing therefrom under 35 U.S.C. 119, the contents of each of which in its entirety are herein incorporated by reference.

BACKGROUND

1. Technical Field

The present inventive concepts relate to systems and methods for detecting defects.

2. Description of the Related Art

Semiconductors are manufactured through a variety of processes. With the development of the design technology of semiconductors, the number of processes for manufacturing semiconductors increases and the complexity of each process increases. With the increase in the number of the semiconductor processes and the complexity thereof, a variety of defects may occur during the semiconductor manufacturing process. For example, unintended patterns may occur due to after development inspection (ADI) dispersion and atomic layer deposition (ALD) dispersion, and with the increase in the aspect ratio, there is a problem in that the intended patterns are not formed.

These defects may then have a fatal effect on the semiconductor device. Therefore, detection of defects is becoming important.

SUMMARY

Technical aspects to be achieved through some example embodiments by the present inventive concepts provide systems for detecting defects that can detect defects more quickly and accurately.

Technical aspects to be achieved through some example embodiments by the present inventive concepts also provide methods for detecting defects that can detect defects more quickly and accurately.

According to some example embodiments, a system for detecting defects may include a memory configured to store a program of instructions, and a processor. The processor may be configured to execute the program of instructions to convert an SEM image into an image layout, where the SEM image is an image obtained based on photographing a semiconductor pattern formed on a semiconductor wafer using a design layout based on using a scanning electron microscope, determine a search space based on performing a first layout matching for the image layout and the design layout, match the image layout and the design layout based on performing a second layout matching in the search space, and output defect information based on detecting defects associated with the matched image layout and the matched design layout.

According to some example embodiments, a method for detecting defects may include converting an SEM image into an image layout, wherein the SEM image is an image obtained based on photographing a semiconductor pattern formed on a semiconductor wafer using a design layout based on using a scanning electron microscope, determining a search space based on overlapping the image layout and the design layout in search units, matching the image layout and the design layout in the search space, and detecting defects in the matched image layout and the matched design layout.

According to some example embodiments, a system for detecting defects may include a memory configured to store program of instructions, and a processor. The processor may be configured to execute the program of instructions to convert an SEM image into an image layout, wherein the SEM image is an image obtained based on photographing a semiconductor pattern formed on a semiconductor wafer using a design layout based on using a scanning electron microscope, determine a search space based on performing first layout matching for the image layout and the design layout, match the image layout and the design layout using a stochastic gradient descent, and output defect information based on detecting defects in the matched image layout and the matched design layout.

The technical aspects of the present inventive concepts are not restricted to those set forth herein, and other unmentioned technical aspects will be clearly understood by one of ordinary skill in the art to which the present inventive concepts pertain by referencing the detailed description of the present inventive concepts given below.

BRIEF DESCRIPTION OF THE DRAWINGS

The above and other aspects and features of the present inventive concepts will become more apparent by describing in detail exemplary embodiments thereof with reference to the attached drawings, in which.

DETAILED DESCRIPTION

Hereinafter, some example embodiments of the present inventive concepts will be described with reference to the attached drawings.

As described herein, when an operation is described to be performed "by" performing additional operations, it will be understood that the operation may be performed "based on"

the additional operations, which may include performing said additional operations alone or in combination with other further additional operations.

Figure 1:
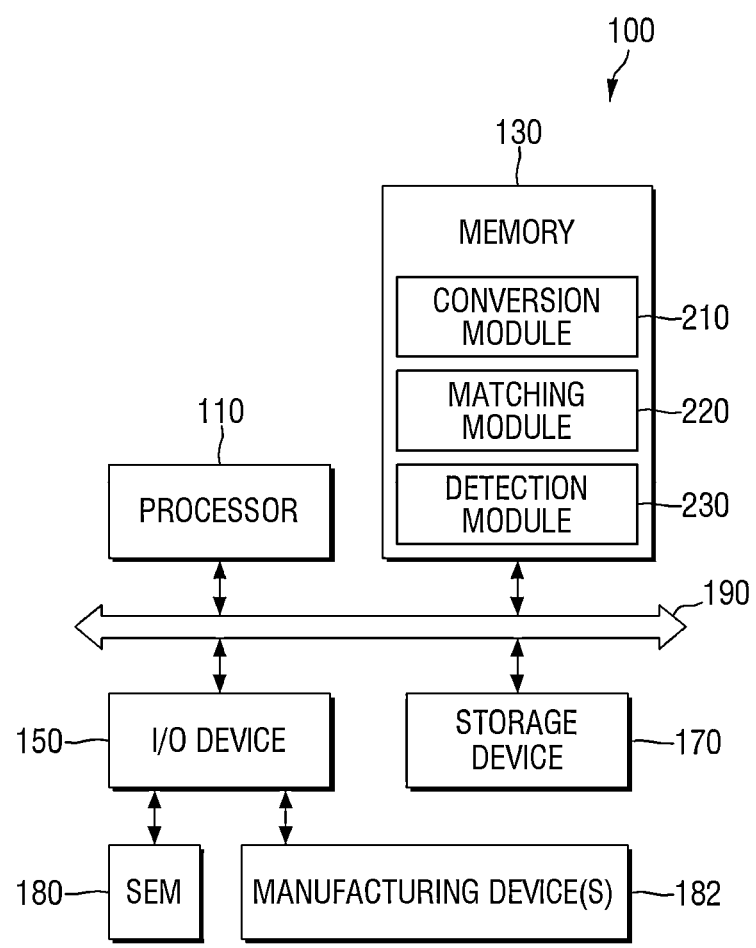
FIG. 1 is a block diagram illustrating a defect detection system according to some example embodiments.

FIG. 1 is a block diagram illustrating a defect detection system according to some example embodiments.

Referring to FIG. 1, a defect detection system 100 according to some example embodiments may include a processor 110, a memory 130, an input/output device 150, a storage device 170, and a bus 190. The defect detection system 100 may be implemented with, for example, an integrated device. The defect detection system 100 may be provided, for example, as a dedicated device for detecting defects. The defect detection system 100 may be, for example, a computer for driving various modules for detecting defects.

The defect detection system 100 may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory 130), for example a solid state drive (SSD), storing a program of instructions, and a processor (e.g., processor 110) configured to execute the program of instructions to implement the functionality and/or methods performed by some or all of any devices, packages, systems, electronic devices, blocks, modules, units, controllers, circuits, and/or portions thereof according to any of the example embodiments, and/or any portions thereof.

The processor 110 may control the defect detection system 100. The processor 110 may execute an operating system and firmware for driving the defect detection system 100. The processor 110 may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like.

The processor 110 may include a core capable of executing any instructions, such as a micro-processor, an application processor (AP), a digital signal processor (DSP), or a graphical processing unit (GPU).

The processor 110 may communicate with the memory 130, the input/output device 150, and the storage device 170 via the bus 190. The processor 110 may drive a conversion module 210 loaded into the memory 130 and convert an SEM image into an image layout with a layout format. The processor 110 may match the image layout and the design layout using a matching module 220 loaded into the memory 130. The processor 110 may detect defects by using a detection module 230 loaded into the memory 130.

The conversion module 210, the matching module 220, and the detection module 230 may be programs (also referred to herein as programs of instructions) or software modules including a plurality of instructions executed by the processor 110, and may be stored in a computer-readable storage medium. For example, the processor 110 may be configured to implement any of the modules as described herein (e.g., conversion module 210, the matching module 220, and/or the detection module 230) based on executing a program (e.g., program of instructions) stored in the memory 130. A program of instructions described to be stored in a memory 130 may be interchangeably referred to as being stored at the memory 130 and/or stored on the memory 130.

The memory 130 may store the conversion module 210, the matching module 220, and the detection module 230. For example, the memory 130 may be a non-transitory computer readable medium storing a program of instructions that, when executed by the processor 110, cause the processor 110 to implement and/or execute the functionality of one or more of the conversion module 210, the matching module 220, and/or the detection module 230. The conversion module 210, the matching module 220, and the detection module 230 (e.g., a program of instructions that may be executed by the processor 110 to cause the processor 110 to implement and/or execute the functionality of one or more of the conversion module 210, the matching module 220, and/or the detection module 230) may be stored and/or loaded, for example, from the storage device 170.

The memory 130 may be a volatile memory such as SRAM or DRAM, or a non-volatile memory such as PRAM, MRAM ReRAM or a FRAM NOR flash memory. The memory 130 may include, for example, a memory card (MMC, eMMC, SD, MicroSD, etc.), a solid-state drive (SSD), a hard disk drive (HDD), and the like.

The input/output device 150 may control user input and output from user interface devices. For example, the input/output device 150 may include input devices such as a keyboard, a mouse, and a touch pad, and may receive different types of data. For example, the input/output device 150 may include outputs device such as a display and a speaker to display different types of data.

All kinds (e.g., types) of data related to the conversion module 210, the matching module 220, and/or the detection module 230 may be stored in the storage device 170. The storage device 170 may store codes such as an operating system or firmware executed by the processor 110.

The storage device 170 may include, for example, a memory card (MMC, eMMC, SD, MicroSD, etc.), a solid-state drive (SSD), a hard disk drive (HDD), and the like.

Figure 2:
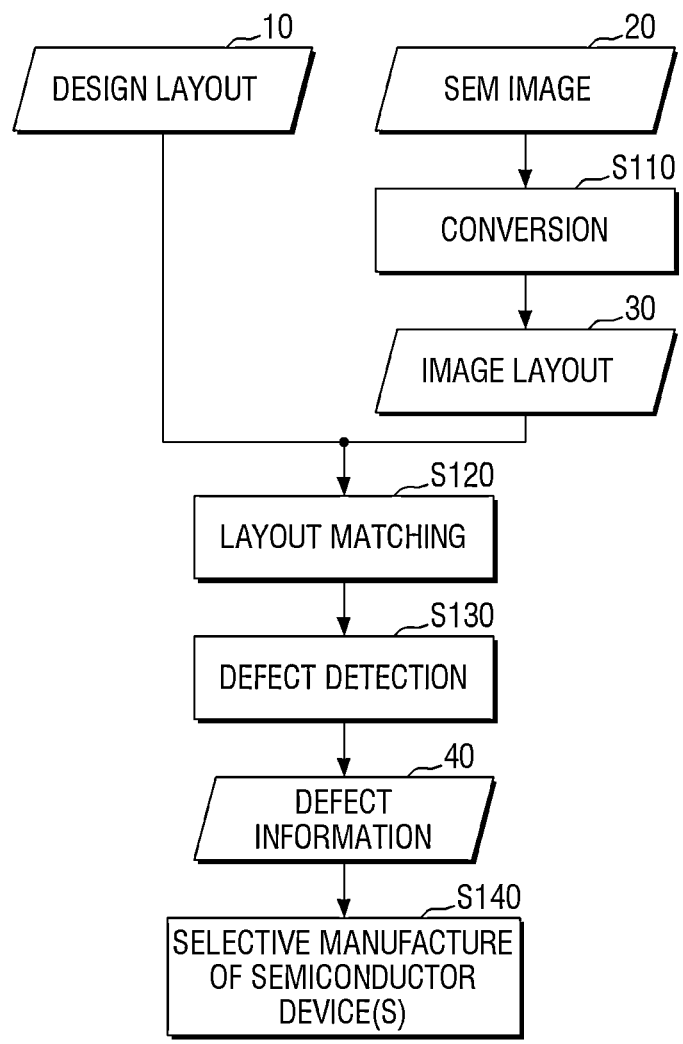
FIG. 2 is a diagram illustrating a method for detecting defects according to some example embodiments.

FIG. 2 is a diagram illustrating a method for detecting defects according to some example embodiments. One or more, or all operations of the method as shown in FIG. 2 may be implemented by any of the example embodiments of the defect detection system 100, for example based on the processor 110 executing a program of instructions stored on (e.g., stored by) the memory 130. For example, an operation that is described herein as being performed by a module may be understood to be an operation that is performed based on the processor 110 executing a program of instructions stored at the memory 130 to implement the module. In another example, where an operation is described herein as involving information being received at a module, it will be understood that the information may be received at a processor executing a program of instructions to implement the module. It will be understood that implementing a module may be referred to interchangeably as implementing the functionality of the module (e.g., processor 110 implementing a module and/or the functionality of the module based on executing a program of instructions stored at the memory 130).

Referring to FIGS. 1 and 2, the conversion module 210 (e.g., a processor 110 executing a program of instructions to implement the conversion module 210) may receive a scanning electron microscope (SEM) image 20 (e.g., via the input/output device 150). The SEM image 20 may be an image obtained by (e.g., based on) photographing a semiconductor pattern formed on a semiconductor wafer using a scanning electron microscope (SEM) 180. The SEM image 20 may be, for example, one image obtained based on an SEM 180 photographing at least one of a plurality of chips included in a wafer and transmitting the image to the defect detection system 100. As shown, the SEM 180 may be communicatively coupled to the defect detection system 100 via the input/output device 150. In some example embodiments, the SEM 180 that is configured to photograph a semiconductor pattern on a semiconductor wafer to obtain (e.g., generate) the SEM image 20 may be a part of the defect detection system 100 and may be connected to the bus 190.

The conversion module 210 (e.g., a processor 110 executing a program of instructions to implement the conversion module 210) may convert the SEM image 20 into an image layout 30 (S110). The conversion module 210 may convert the SEM image 20 in an image format into the image layout 30 in a layout format (e.g., convert the SEM image 20 of the semiconductor pattern into an image layout 30 that includes a pattern representing the structure of the semiconductor pattern). The layout format may be, for example, formats such as a graphical design system (GDS), a GDS II, an Open Artwork System Interchange Standard (OASIS). The converting the SEM image 20 into the image layout 30 may include generating the image layout 30 as an image based on processing the SEM image 20 (e.g., applying one or more algorithms to the pixel values of the SEM image 20 to generate corresponding pixel values of the image layout 30).

The conversion module 210 (e.g., a processor 110 executing a program of instructions to implement the conversion module 210) may include (e.g., execute) a variety of algorithms for converting the SEM image 20 into the image layout 30. The conversion module 210 may include (e.g., execute), for example, algorithms such as noise reduction, segmentation, and/or contour tracing. The conversion module 210 (e.g., a processor 110 executing a program of instructions to implement the conversion module 210) may convert the SEM image 20 into the image layout 30 using at least one algorithm.

The matching module 220 (e.g., a processor 110 executing a program of instructions to implement the matching module 220) may receive a design layout 10. The design layout 10 is a layout (e.g., the design layout 10 may be an image illustrating a layout as a pattern) for implementing a semiconductor pattern on a semiconductor wafer. The SEM image 20 may be an image obtained by (e.g., based on) photographing the semiconductor pattern formed on the semiconductor wafer using a scanning electron microscope (SEM) 180 where the semiconductor pattern is formed on the semiconductor wafer based on using the design layout 10. For example, the semiconductor pattern that is formed on the semiconductor wafer, and which is photographed by the SEM 180, may be formed based on using the design layout 10 so that the semiconductor pattern is formed to correspond to the design layout 10.

The matching module 220 may match the design layout 10 and the image layout 30 (S120). The design layout 10 and the image layout 30 may overlap each other based on the matching.

The detection module 230 may detect one or more defects (e.g., defects in the semiconductor pattern imaged in the SEM image 20) based on a result of matching the design layout 10 and the image layout 30 (S130). The detection module 230 may output (e.g., generate and/or transmit) defect information 40 including information on the detected defect(s). The defect information 40 may include, for example, information indicating the presence or absence of defects, the type of defects (e.g., the defect type of each of the defects), and the location of defects. The defect information 40 may indicate a particular one or more semiconductor patterns, semiconductor wafers, or the like associated with the detected defects.

As shown, the defect detection system 100 may be communicatively coupled (e.g., via the input/output device 150) to one or more manufacturing devices 182 of a semiconductor device manufacturing system. The one or more manufacturing devices 182 may be part of a semiconductor device manufacturing system that forms the semiconductor pattern on the semiconductor wafer and may further process the semiconductor wafer to form a semiconductor device and may further incorporate the semiconductor device into a manufactured electronic device (e.g., a computing device including at least a processor and a memory coupled via a bus, a semiconductor chip, etc.). In some example embodiments, the defect detection system 100 (e.g., the processor 110 executing a program of instructions) may output (e.g., transmit) the defect information 40 to the one or more manufacturing devices 182 to cause the one or more manufacturing devices 182 to, at S140, selectively manufacture one or more semiconductor devices, including selectively including in the semiconductor device manufacturing process, excluding from the semiconductor device manufacturing process, redirecting, repairing, discarding, etc. one or more semiconductor patterns and/or semiconductor wafers based on the defect information 40.

For example, the defect information 40 may further indicate that the defect information is associated with one or more particular semiconductor patterns and/or semiconductor wafers, which may include the semiconductor wafer with the semiconductor pattern imaged in the SEM image and/or one or more semiconductor patterns/wafers represented by the semiconductor pattern/wafer imaged in the SEM image. The one or more manufacturing devices 182 may selectively restrict (e.g., exclude) a semiconductor pattern formed on a semiconductor wafer and/or said semiconductor wafer (e.g., the semiconductor pattern and/or wafer imaged in the SEM image 20 and/or one or more semiconductor patterns and/or semiconductor wafers represented by the semiconductor pattern and/or wafer imaged in the SEM image 20) from being forwarded for further processing and/or manufacturing operations in a manufacturing process to manufacture a semiconductor device including at least a portion of the semiconductor pattern and/or wafer based on the defect information 40 indicating defects in the imaged the images semiconductor pattern.

For example, the one or more manufacturing devices 182 may include one or more actuators, conveyors, or the like that may be configured to selectively re-direct one or more semiconductor patterns and/or semiconductor wafers in a semiconductor device manufacturing process to a repair system in response to receiving defect information 40 indicating that the defect information is associated with the one or more semiconductor patterns and/or semiconductor wafers (e.g., the defect information indicates a defect in the one or more semiconductor patterns and/or semiconductor wafers or a defect in a semiconductor pattern and/or wafer that represents a batch of semiconductor patterns and/or semiconductor wafers that includes the one or more semiconductor patterns and/or semiconductor wafers). The one or more manufacturing devices 182 may be configured to direct the re-directed one or more semiconductor patterns and/or semiconductor wafers to a repair system that is configured to repair one or more defects in the one or more semiconductor patterns and/or semiconductor wafers that may be indicated by the defect information 40 associated with the one or more semiconductor patterns and/or semiconductor wafers and then to subsequently return the repaired one or more semiconductor patterns and/or semiconductor wafers to the manufacturing process. The one or more manufacturing devices 182 may be configured to direct the re-directed one or more semiconductor patterns and/or semiconductor wafers to a discard system that is configured to discard the one or more semiconductor patterns and/or semiconductor wafers and thus restrict the one or more semiconductor patterns and/or semiconductor wafers having defects from being included in a manufactured semiconductor device and/or electronic device. Where the defect detection system 100 does not output defect information 40 associated with a particular semiconductor pattern and/or wafer in the manufacturing process, the one or more manufacturing devices 182 may be configured to selectively forward the particular semiconductor pattern and/or wafer in the manufacturing process to manufacture a completed semiconductor device and/or electronic device including same.

Based on the defect information 40 being used to cause the one or more manufacturing devices 182 to selectively direct or re-direct one or more semiconductor patterns and/or semiconductor wafers in a semiconductor device manufacturing process and/or electronic device manufacturing process, the likelihood of defects being included in a completed semiconductor device and/or electronic device may be reduced, and thus the defect detection system may be configured to cause a semiconductor device and/or electronic device manufacturing system to provide semiconductor devices and/or electronic devices having improved reliability and/or improved performance. Accordingly, the defect detection system 100, based on being configured to perform some or all of the method operations shown in FIG. 2, including at least operations S110-S130 (and in some example embodiments further including operation S140), may be configured to enable a more efficient and accurate manufacture of completed semiconductor devices and/or electronic devices having reduced defects and thus improved performance, reliability, or the like. Additionally, where the one or more manufacturing devices 182 are configured to selectively re-direct semiconductor devices associated with defects as indicated by defect information 40 be repaired and returned to the manufacturing process, the defect detection system 100 may be configured to enable improved manufacture of defect-free (and thus improved performing and/or improved reliability) semiconductor devices.

Additionally, the defect detection system 100, based on being configured to perform some or all of the method operations shown in FIG. 2, including at least operations S110-S130 (and in some example embodiments further including operation S140) may be configured to detect defects (and output defect information indicating same) with improved accuracy, speed, efficiency, or the like, for example based on being configured to perform a defect detection process including conversion of an SEM image of a semiconductor pattern into an image layout, perform matching of the image layout with a design layout used to form the SEM-imaged semiconductor pattern and detect defects according to the matched image and design layouts. As a result, the defect detection system 100 may be configured to provide improved performance (e.g., accuracy and/or speed) and efficiency of defect detection in semiconductor patterns formed on a semiconductor wafer, for example based on detecting defects associated with the semiconductor pattern and/or wafer based on performing conversion of an SEM image 20 of the semiconductor pattern to an image layout 30, matching the image layout 30 to the design layout 10 that was used to form the semiconductor pattern, and/or on detecting defects based on processing the matched image and design layouts.

In some example embodiments, the one or more manufacturing devices 182 may be included in the defect detection system 100 and/or may be configured to be controlled by the processor 110, such the operation S140 may be controlled and/or performed based on the processor 110 executing a program of instructions stored in the memory 130.

FIGS. 3, 4, 5, and 6 are views for explaining a method of converting an SEM image into an image layout according to some example embodiments.

Figure 3:
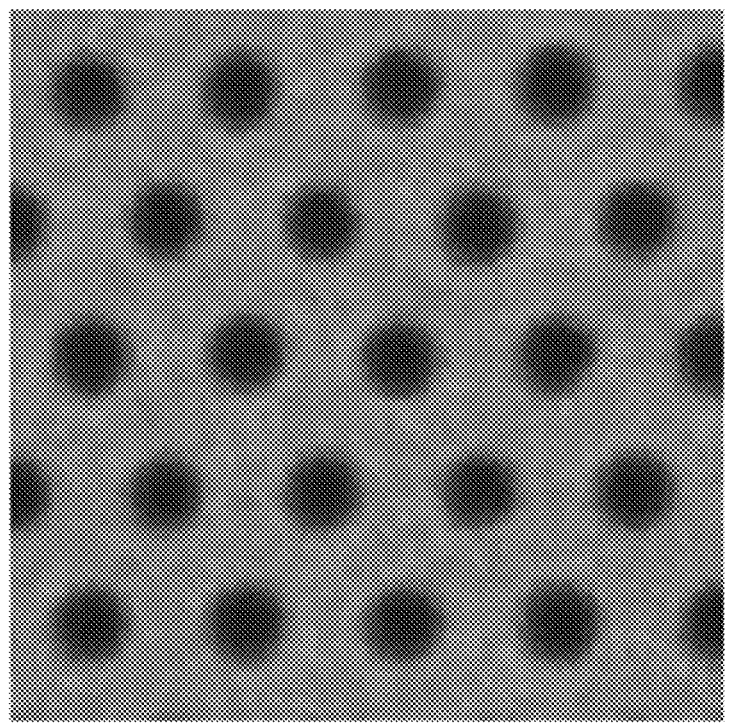
FIGS. 3, 4, 5, and 6 are views for explaining a method of converting an SEM image into an image layout according to some example embodiments.
Figure 4:
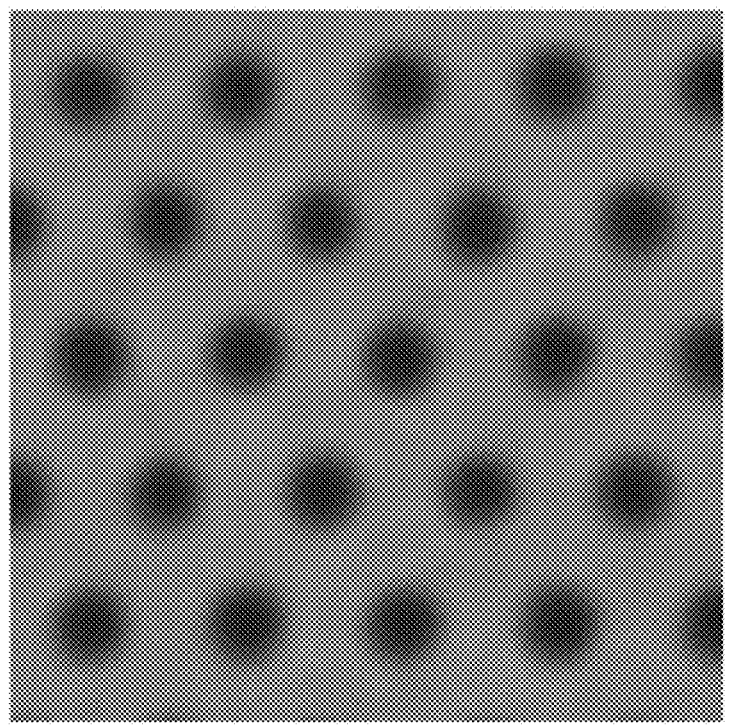

Referring to FIGS. 1, 3, and 4, the conversion module 210 (e.g., a processor 110 executing a program of instructions to implement the conversion module 210) may generate a first image 21 from which noise is removed from the SEM image 20 by (e.g., based on) using a noise filtering algorithm (e.g., based on applying the noise filtering algorithm to the image data of the SEM image 20 to generate the first image 21).

Figure 5:
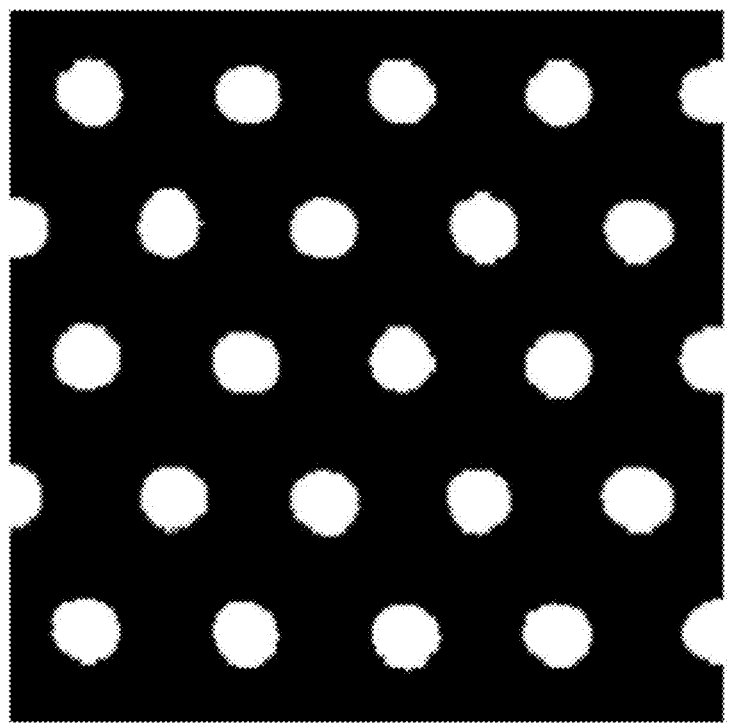

Referring to FIGS. 1, 4, and 5, the conversion module 210 (e.g., a processor 110 executing a program of instructions to implement the conversion module 210) may generate a second image 22 by (e.g., based on) using a segmentation algorithm of the first image 21 (e.g., based on applying the segmentation algorithm to the image data of the first image 21 to generate the second image 22).

The segmentation algorithm may be, for example, a model for predicting to which class each pixel of an image belongs. The segmentation model may be implemented as a gray scale model or a red, green, glue (RGB) model. The segmentation model implemented on a gray scale may be a binary model. The segmentation model may generate, for example, a pattern image separated from the background in pixel units. The conversion module 210 (e.g., a processor 110 executing a program of instructions to implement the conversion module 210) may generate the second image 22 by (e.g., based on) separating the background and the pattern image from the first image 21.

Figure 6:
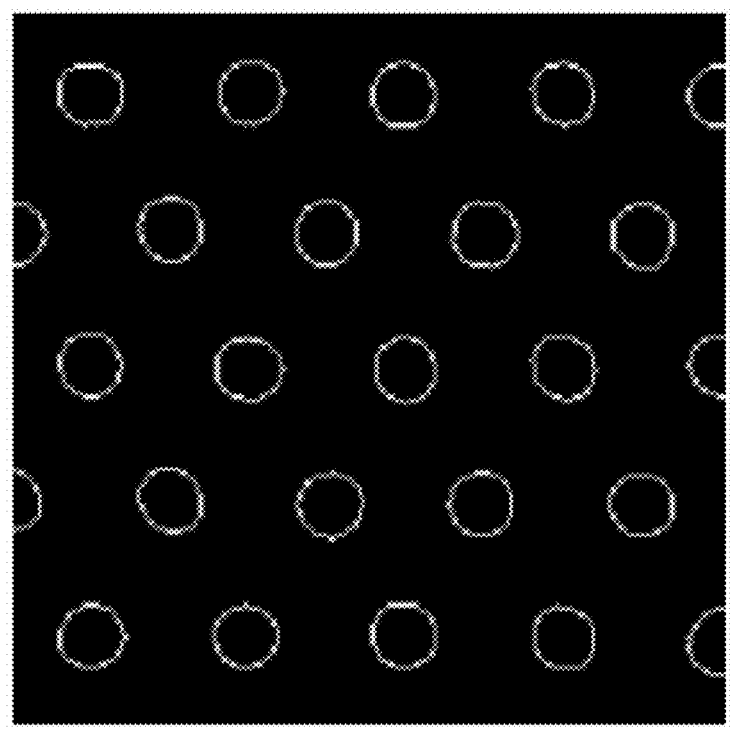

Referring to FIGS. 5 and 6, the conversion module 210 (e.g., a processor 110 executing a program of instructions to implement the conversion module 210) may generate an image layout 30 using a contour tracing algorithm in the second image 22 (e.g., based on applying the contour tracing algorithm to the image data of the second image 2 to generate the image layout 30).

When the design layout 10 (e.g., a design pattern according to which the semiconductor pattern is formed or manufactured on the wafer) is converted into the image format, like the SEM image 20, image matrix processing in pixel units may be used. However, since the conversion module 210 according to some example embodiments converts the SEM image 20 into the image layout 30 in the layout format, all patterns on the image layout 30 may be processed in units of shapes. Accordingly, the image layout 30 may be processed more quickly than when the design layout 10 is converted into the image format. Accordingly, a defect detection system 100 configured to detect defects associated with a semiconductor pattern imaged in an SEM image 20 based at least in part upon converting the SEM image 20 into an image layout 30 (which is then matched with the design layout to detect defects) may be configured to detect defects more quickly and with improved accuracy, and thus may be configured to provide improved defect detection performance and/or improved defect detection efficiency, thereby enabling improved manufacturing of defect-free semiconductor devices and/or electronic devices based on identifying semiconductor patterns and/or semiconductor wafers associated with defects, based on performing the conversion of the SEM image 20 of the semiconductor pattern into the image layout 30 that is matched with the design layout 10 to perform the defect detection at S120-S130.

Figure 7:
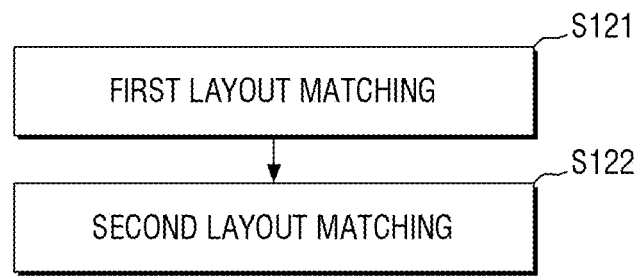
FIG. 7 is a flowchart illustrating step S120 in FIG. 2 according to some example embodiments.

FIG. 7 is a flowchart illustrating step S120 in FIG. 2 according to some example embodiments. FIGS. 8, 9, 10, 11, 12, and 13 are diagrams illustrating the step S120 in FIG. 2. FIG. 8, FIG. 10, FIG. 12, and FIG. 13 are views illustrating an overlapping design layout and an image layout, FIG. 9 is a view illustrating the design layout, and FIG. 11 is an enlarged view of an R region in FIG. 10.

Referring to FIGS. 1 and 7, the matching module 220 (e.g., a processor 110 executing a program of instructions to implement the matching module 220) may determine a search space by (e.g., based on) performing first layout matching for the design layout 10 and the image layout 30 (S121). The first layout matching may be coarse matching. The matching module 220 may match (e.g., overlap) the design layout 10 and the image layout 30 in search units to determine the search space so that a cost is the lowest (e.g., so that a cost is reduced and/or minimized). An overlap of the design layout 10 and the image layout 30 having minimized cost may correspond to a maximized area where a pattern of the design layout 10 and a pattern of the image layout 30 overlap. The matching module 220 may overlap the design layout 10 and the image layout 30 in search units (e.g., incrementally adjust the overlap of the design layout 10 and the image layout 30 by search units and determining a cost of each adjusted overlap to determine an overlap positioning of the design layout 10 in relation to the image layout 30 that reduces or minimizes the associated cost) to determine a search space so that the cost is the lowest (e.g., so that a cost is reduced and/or minimized). A cost of an overlap relative positioning of the design layout 10 and the image layout 30 may be a quantification (e.g., a sum) of a quantity of first inferior patterns in which a pattern of the design layout 10 fails to appear in the image layout 30 in the overlap and/or a quantity of second inferior patterns in which a pattern that is not present in the design layout 10 appears in the image layout 30 in the overlap. A cost of an overlap relative positioning of the design layout 10 and the image layout 30 may be inversely proportional to a magnitude of an area where a pattern of the design layout 10 and a pattern of the image layout 30 overlap, such that maximization of such area may correspond to minimization of such cost.

Figure 8:
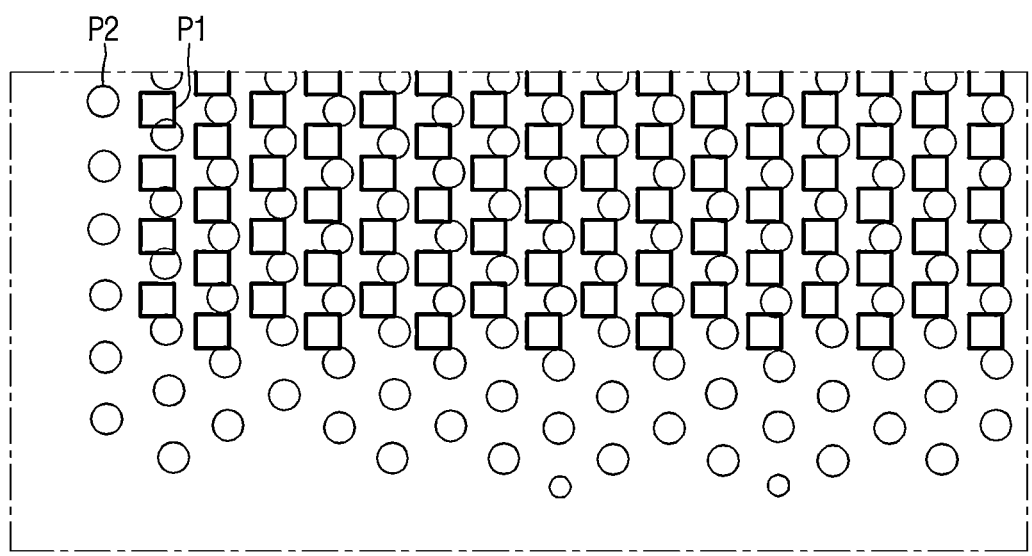
FIGS. 8, 9, 10, 11, 12, and 13 are views illustrating the step S120 in FIG. 2 according to some example embodiments.
Figure 9:
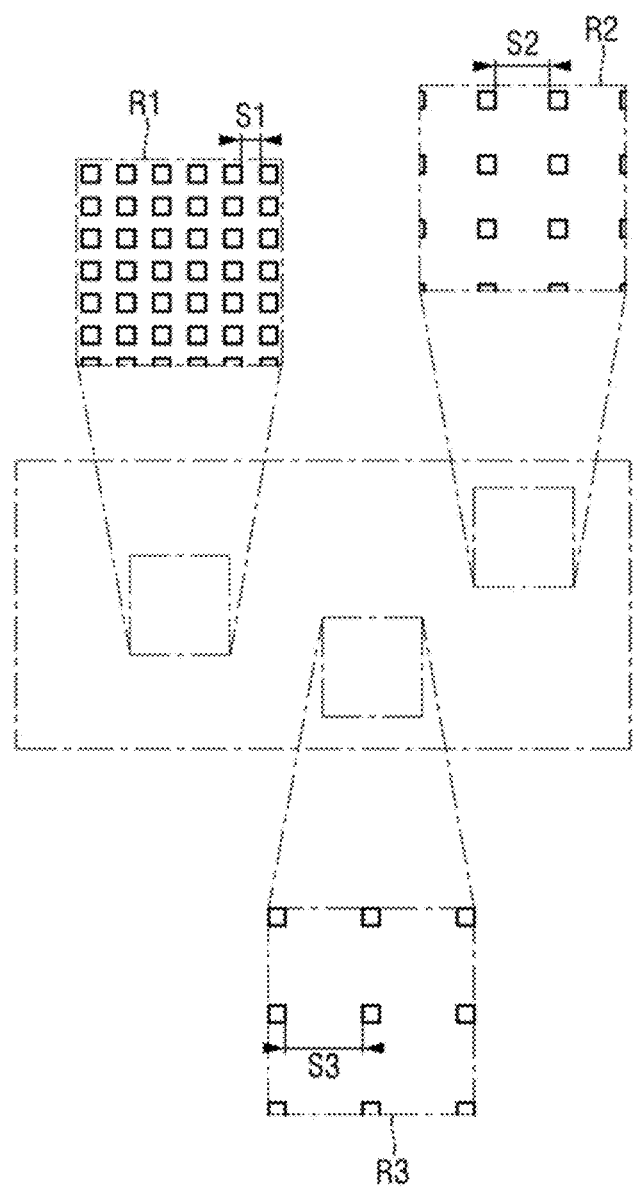

Specifically, referring to FIGS. 1 and 8, the matching module 220 (e.g., a processor 110 executing a program of instructions to implement the matching module 220) may move the image layout 30 in search units on the design layout 10 and calculate the cost associated with the resulting overlap of the image layout 30 and the design layout 10. The conversion module 210 may calculate the cost based on a pattern P1 of the design layout 10 and a pattern P2 of the image layout 30. The conversion module 210 may calculate the cost based on the number (e.g., quantity) of first inferior patterns in which the pattern P1 of the design layout 10 fails to appear in the image layout 30 and the number (e.g., quantity) of second inferior patterns in which a pattern that is not present in the design layout 10 appears in the image layout 30. The cost may be lower as the number (e.g., quantity) of first inferior patterns and the number (e.g., quantity) of second inferior patterns decrease. For example, the matching module 220 may overlap the design layout 10 and the image layout 30 in search units to determine a search space so that the cost is the lowest based on determining a search space where a quantity of first inferior patterns in which a pattern of the design layout fails to appear in the image layout and/or a quantity of second inferior patterns in which a pattern that is not present in the design layout appears in the image layout is minimized (e.g., both quantities may be minimized).

In some example embodiments, the matching module 220 may move the design layout 10 in search units on the image layout 30 and calculate the cost associated with each relative position of the design layout 10 overlapping the image layout 30 to determine the relative position associated with a minimum cost as the search space.

Figure 10:
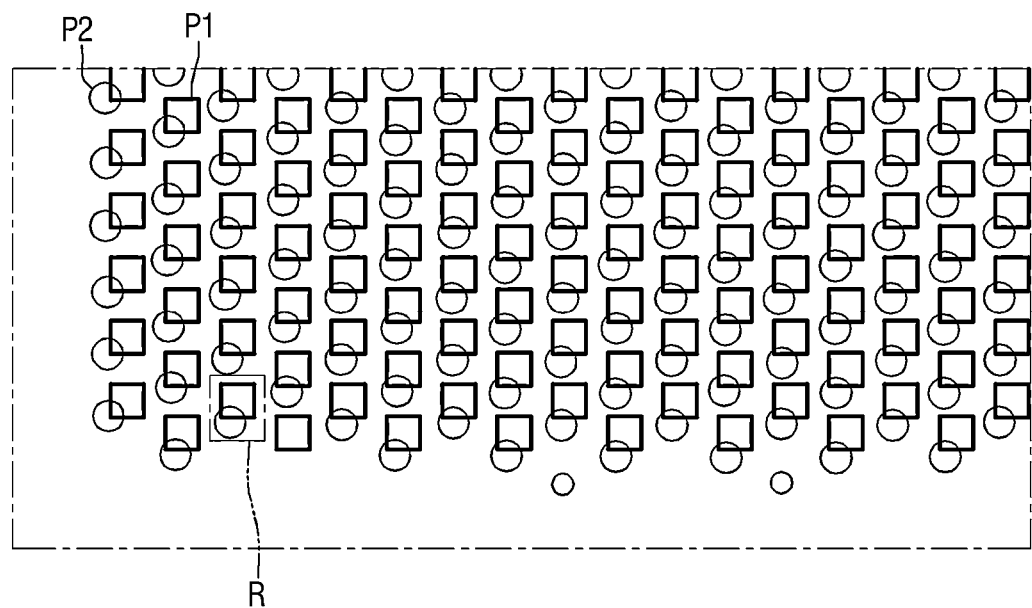
Figure 11:
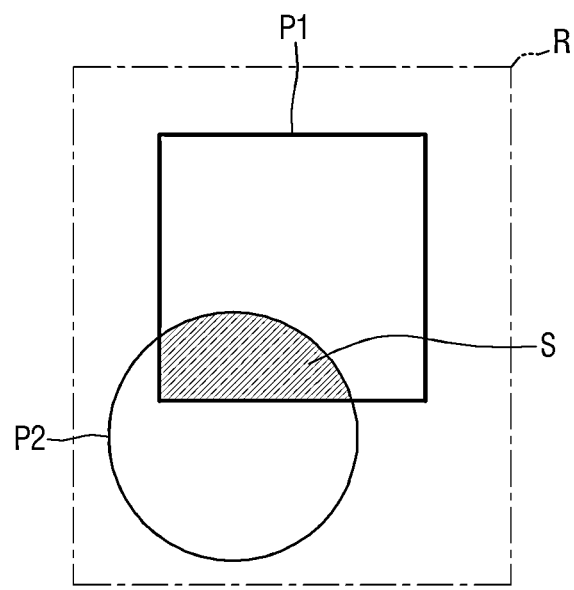
Figure 12:
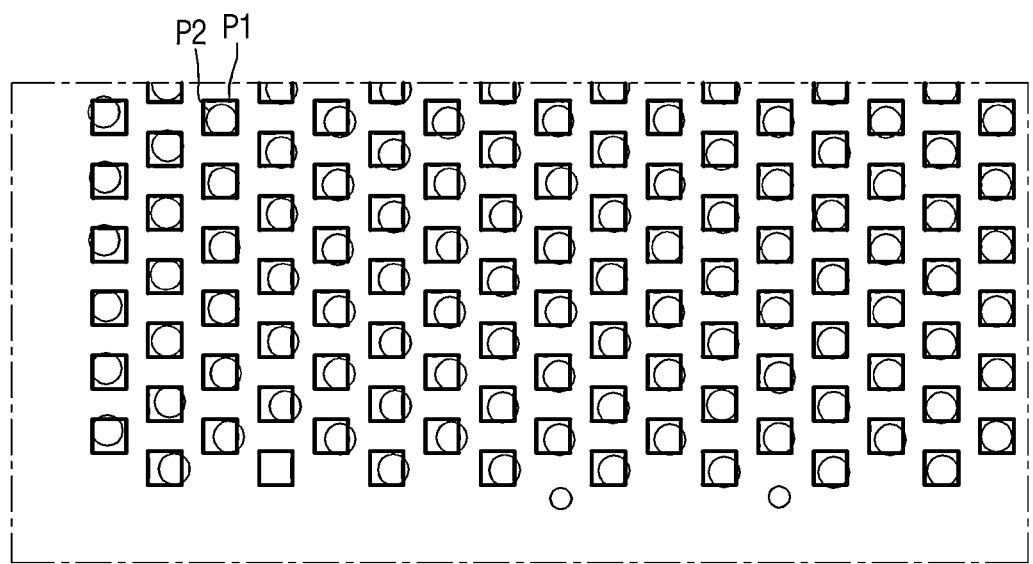

Referring to FIGS. 1 and 10, the matching module 220 may determine the search space of the design layout 10 and the image layout 30 so as to have the lowest (e.g., minimum) cost. That is, the design layout 10 and the image layout 30 may overlap so that the number (e.g., quantity) of first inferior patterns and the number (e.g., quantity) of second inferior patterns are the lowest (e.g., are minimized).

In some example embodiments, the matching module 220 (e.g., a processor 110 executing a program of instructions to implement the matching module 220) may determine a search unit from the design layout 10. The matching module 220 may determine the search unit(s) (e.g., determine a magnitude of search units via which the image layout and design layout are overlapped to determine the search space) based on a design rule. That is, the matching module 220 may determine the search unit in consideration of patterns of the design layout 10. The matching module 220 may determine the search unit based on an interval at which a plurality of patterns of the design layout 10 are disposed. The matching module 220 may determine, for example, the smallest interval at which the plurality of patterns are disposed in the design layout 10 in search units.

Specifically, referring to FIG. 9, the design layout 10 may include the plurality of patterns disposed at different intervals. For example, a plurality of patterns of the first region R1 of the design layout 10 may be disposed at a first interval S1, a plurality of patterns of the second region R2 of the design layout 10 may be disposed at a second interval S2, and a plurality of patterns of the third region R3 of the design layout 10 may be disposed at a third interval S3. In this case, the first interval S1 may be smaller than the second interval S2, and the second interval S2 may be smaller than the third interval S3. The matching module 220 may determine the first interval S1, which is the smallest interval, in search units.

Since the matching module 220 according to some example embodiments determines the search unit(s) based on the design rule of the design layout 10, the search space may be more efficiently determined.

In some example embodiments, the matching module 220 may determine a value input from the outside (e.g., a value received at the defect detection system 100 from a source external to the defect detection system 100) in search units. For example, the matching module 220 may receive the value from the input/output device 150 in FIG. 1.

Referring to FIGS. 1, 7, and 10 to 12, the matching module 220 may perform second layout matching for the design layout 10 and the image layout 30 (S122). The matching module 220 may optimize the match between the design layout 10 and the image layout 30 by (e.g., based on) performing the second layout matching in the search space determined in the first layout matching. The second layout matching may be fine matching.

The matching module 220 may optimize the match between the design layout 10 and the image layout 30 based on an area S where the pattern P1 of the design layout 10 and the pattern P2 of the image layout 30 overlap. The matching module 220 may optimize the match between the design layout 10 and the image layout 30 so that an area S where the pattern P1 of the design layout 10 and the pattern P2 of the image layout 30 overlap is the largest (e.g., is maximized), which may correspond to a lowest (e.g., minimized) cost of the overlap of the design layout 10 and the image layout 30. Accordingly, the matching module 220 may determine matching coordinates of the design layout 10 and the image layout 30.

The matching module 220 may perform the second layout matching using, for example, a stochastic gradient descent (SGD). The matching module 220 may match the design layout 10 and the image layout 30 so that an area where the pattern P1 of the design layout 10 and the pattern P2 of the image layout 30 overlap is the largest (e.g., is maximized) using the stochastic gradient descent.

Figure 13:
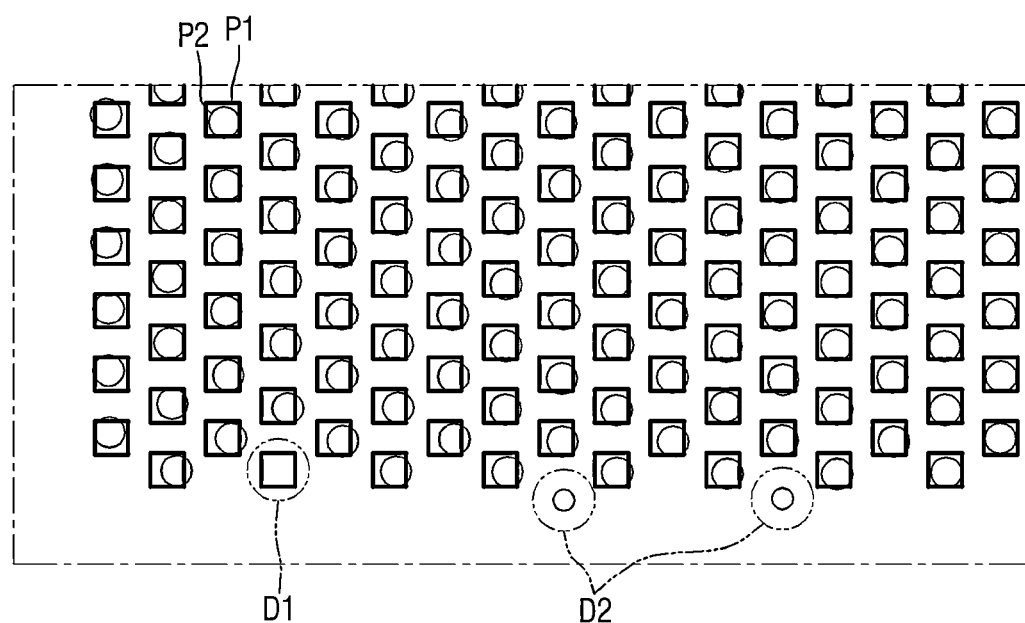

FIG. 13 is a view illustrating a method for detecting defects according to some example embodiments.

Referring to FIGS. 1 and 13, the detection module 230 may output (e.g., generate and/or transmit) defect information 40 based on the matched design layout 10 and the matched image layout 30. The defect information may include (e.g., may indicate) at least one of a location of defect, a type (e.g., defect type) of the defect, and/or a coordinate of the defect. The detection module 230 may further output the defect information 40 to include information indicating that the defect information 40 is associated with one or more particular semiconductor patterns and/or semiconductor wafers upon which one or more particular semiconductor patterns are formed. The defect information 40 may be used (e.g., by one or more manufacturing devices 182) to selectively manufacture one or more semiconductor devices (e.g., selectively exclude particular semiconductor patterns and/or semiconductor wafers associated with the defect information 40 in a manufacturing process to manufacture a semiconductor device, including selectively re-directing such particular semiconductor patterns and/or semiconductor wafers associated with the defect information 40 to a repair process or to be discarded, based on determining that the particular semiconductor patterns and/or semiconductor wafers are associated with the defect information 40).

The type of defect may include, for example, a first inferior pattern D1 and a second inferior pattern D2. The detection module 230 may detect, for example, the first inferior pattern D1 in which the pattern P1 of the design layout 10 fails to appear in the image layout 30 and the second inferior pattern D2 in which a pattern that is not present in the design layout 10 appears in the image layout 30.

In addition, the detection module 230 may detect a pattern of the design layout 10 as an inferior pattern when the pattern of the design layout 10 is incompletely formed in the image layout 30 or the sizes of the pattern of the design layout 10 and the pattern of the image layout 30 are smaller than a set size.

Figure 14:
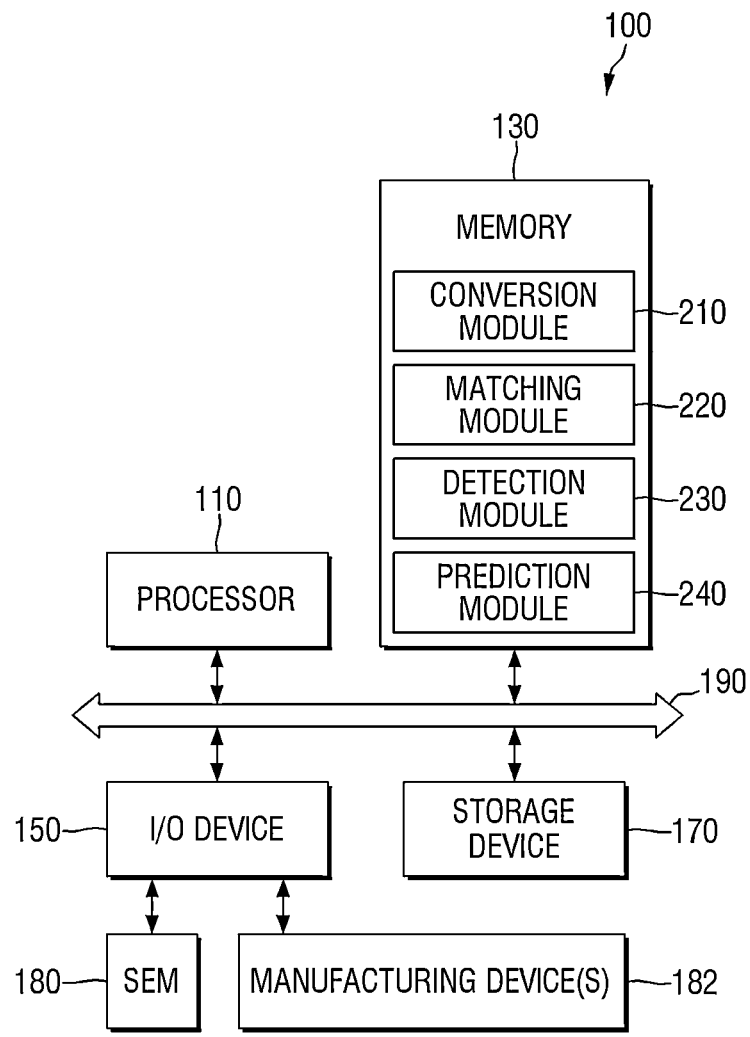
FIG. 14 is a block diagram illustrating the defect detection system according to some example embodiments.

FIG. 14 is a block diagram illustrating the defect detection system according to some example embodiments. For the convenience of description, a difference from those described with reference to FIGS. 1 to 13 will be mainly described below.

Referring to FIG. 14, in the defect detection system 100 according to some example embodiments, the processor 110 may perform machine learning using a design layout, an SEM image, and defect information. Accordingly, the processor 110 may generate (e.g., may implement, for example based on executing a program of instructions stored in the memory 130) a prediction module 240. The defect information may include the presence or absence of defects, the type of defect, and/or the location of defects. As described herein, the prediction module 240 may be referred to interchangeably as a prediction model, and generating a prediction module 240 may be referred to interchangeably as generating a prediction model that may be used to output defect information based on a received target SEM image and design layout.

In some example embodiments, the defect detection system 100 may further include a neural processing unit (NPU). The neural network processing unit may perform the machine learning according to an instruction of the processor 110 and generate (e.g., implement) the prediction module 240.

The processor 110 may predict defects by driving (e.g., based on implementing) the prediction module 240. The prediction module 240 may be a program or software module including the plurality of instructions executed by the processor 110, and may be stored in a computer-readable storage medium (e.g., the memory 130).

The memory 130 may store the prediction module 240. The prediction module 240 may be loaded, for example, from the storage device 170.

Figure 15:
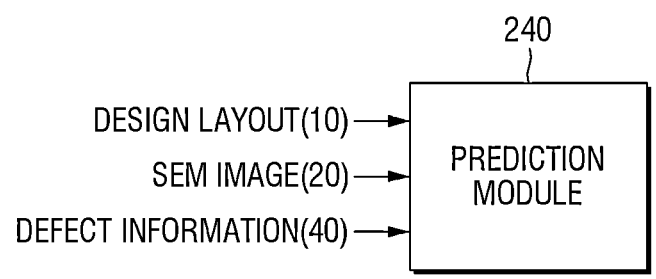
FIGS. 15 and 16 are diagrams for explaining the method for detecting defects according to some example embodiments.
Figures 16, 17:
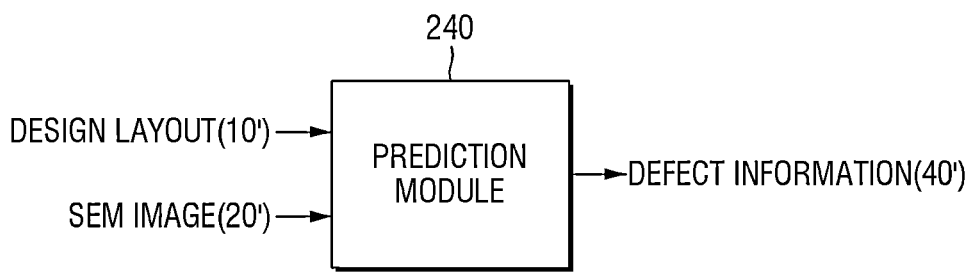
FIG. 17 is a diagram illustrating an effect of the method for detecting defects according to some example embodiments.

FIGS. 15 and 16 are diagrams for describing the method for detecting defects according to some example embodiments.

Referring to FIGS. 14 and 15, the defect detection system 100 according to some example embodiments may perform the machine learning using the design layout 10, the SEM image 20, and the defect information 40. Accordingly, the prediction module 240 (e.g., the prediction model) may be generated based on performing machine learning using the design layout 10, the SEM image 20, and the defect information 40 to generate the prediction model that is configured to determine (e.g., generate) defect information associated with an input target SEM image, indicating defects associated with a semiconductor pattern imaged in the target SEM image that may be output (e.g., transmitted). Restated, the prediction model that is generated based on performing machine learning using the design layout 10, the SEM image 20, and the prediction module 240 (e.g., prediction model) may be configured to generate defect information 40' of (e.g., associated with) a target SEM image 20' (e.g., associated with a semiconductor pattern imaged in the target SEM image 20'), thereby detecting defects in the target SEM image 20', based on processing the target SEM image 20' using the prediction model (and in some example embodiments based on processing the target SEM image 20' together with a design layout 10' as dual inputs to the prediction model). The defect information 40' may be interchangeably referred to herein as target defect information.

The design layout 10 may be a layout for implementing the semiconductor pattern on the wafer, and the image layout 30 may be a layout of an actual semiconductor pattern formed using the design layout 10.

The defect detection system 100 may generate the prediction module 240 using, for example, a convolutional neural network (CNN).

Referring to FIG. 16, the prediction module 240 according to some example embodiments may receive a design layout 10' (also referred to herein interchangeably a target design layout) and a target SEM image 20'. The prediction module 240 may receive a design layout 10' and a target SEM image 20' and may predict defect information 40', for example output (e.g., generate and/or transmit) defect information of (associated with) the target SEM image 20', also referred to herein as target defect information, and thus associated with the semiconductor pattern imaged in the target SEM image 20' based on processing at least the target SEM image 20' (alone or together with the design layout 10') using the prediction module 240.

The defect information 40' may include the presence or absence of defects, the type of defect, and the location of defects. The type of defect may include a first inferior pattern in which a pattern of the design layout 10' fails to appear in the image layout, a second inferior pattern in which a pattern that is not present in the design layout 10' appears in the image layout, and a third inferior pattern in which a pattern in the design layout 10' appears only partially in the image layout, i.e., it appears incompletely.

FIG. 17 is a diagram illustrating an effect of the method for detecting defects according to some example embodiments.

Referring to FIG. 17, a visual inspection in which an inspector manually matches the SEM image and the design layout and overlaps the SEM image and the design layout to detect defects by a visual method may be take about 0.017 hours. When the inspector detects defects for about 1500 test sets, it may take about 25 hours. One test set may include one SEM image and one design layout.

When a brute-force algorithm is used to detect the defects for a single test set, it may require about 40401 searches and take about 0.15 hours. When defects are detected for about 1500 test sets, it may take 225 hours. For example, it is possible to match the design layout and the image layout by moving the image layout on the design layout at regular intervals. The number of searches may refer to the number (e.g., quantity) of searches performed to determine the search space for matching the SEM image with the design layout.

When the defects are detected for one test set using the brute-force algorithm and the first and second layout matching as shown in FIG. 7 (brute force algorithm with two steps), it may require about 3200 searches and may take about 0.0025 hours. In this case, the second layout matching in FIG. 7 fails to use the stochastic gradient descent. When the defects are detected for about 1500 test sets, it may take about 3.75 hours.

When the defects are detected for one set (SGD optimizer with two steps) using the method for detecting defects according to some example embodiments described with reference to FIGS. 1 to 13, it may require about 1630 searches and take about 0.0017. When the defects are detected for about 1500 test sets, it may take about 2.5 hours.

According to some example embodiments, the method for detecting defects (e.g., when performed by the defect detection system 100 according to any of the example embodiments) may automatically convert the SEM image into the image layout without intervention by an inspector (e.g., without human intervention), match the image layout and the design layout, and detect the defects from the matched image layout and the matched design layout. Accordingly, based on the method including converting the SEM image into the image layout, this method may detect the defects faster and more accurately than the method for manually matching the image layout and the design layout and manually detecting the defects by the inspector.

Although some example embodiments of the present inventive concepts have been described above with reference to the accompanying drawings, the present inventive concepts are not limited to such example embodiments, but may be implemented in various different ways, and the present inventive concepts may be embodied in many different forms without changing technical subject matters and essential features as will be understood by those skilled in the art. Therefore, the inventive concepts are not limited to such example embodiments set forth herein.

What is claimed is:

1. A system, the system comprising:
a memory configured to store a program of instructions; and
a processor configured to execute the program of instructions to
convert an SEM image into an image layout, wherein the SEM image is an image obtained based on photographing a semiconductor pattern formed on a semiconductor wafer using a design layout based on using a scanning electron microscope,
determine a search space based on performing a first layout matching for the image layout and the design layout,
match the image layout and the design layout to determine a matched image layout and a matched design layout, respectively, based on performing a second layout matching in the search space, and
output defect information based on detecting defects associated with the matched image layout and the matched design layout,
wherein the processor is configured to execute the program of instructions to perform the first layout matching and determine the search space to minimize at least one of a quantity of first inferior patterns in which a pattern of the design layout fails to appear in the image layout or a quantity of second inferior patterns in which a pattern that is not present in the design layout appears in the image layout.

2. The system of claim 1, wherein the processor is configured to execute the program of instructions to determine the search space based on moving the design layout in search units on the image layout.

3. The system of claim 2, wherein
the design layout includes a first pattern disposed at a first interval and a second pattern disposed at a second interval greater than the first interval, and
the processor is configured to execute the program of instructions to determine the first interval in the search units.

4. The system of claim 2, wherein the processor is configured to execute the program of instructions to determine an input value in the search units.

5. The system of claim 1, wherein the processor is configured to execute the program of instructions to perform the second layout matching and match the image layout and the design layout to maximize an area of an overlap of the pattern of the design layout and a pattern of the image layout.

6. The system of claim 1, wherein the processor is configured to execute the program of instructions to convert the SEM image into the image layout based on using a noise removal algorithm, a segmentation algorithm, and a contour tracing algorithm.

7. The system of claim 1, wherein the processor is configured to execute the program of instructions to detect a first inferior pattern from within the first inferior patterns in which the pattern of the design layout fails to appear in the image layout and a second inferior pattern from within the second inferior patterns in which the pattern that is not present in the design layout appears in the image layout as the defects associated with the matched image layout and the matched design layout.

8. The system of claim 1, wherein the processor is configured to execute the program of instructions to
generate a prediction model based on performing machine learning using the SEM image, the design layout, and the defect information, and
receive a target SEM image using the prediction model, and
output target defect information of the target SEM image based on processing the target SEM image using the prediction model.

9. A method, the method comprising:
converting an SEM image into an image layout, wherein the SEM image is an image obtained based on photographing a semiconductor pattern formed on a semiconductor wafer using a design layout based on using a scanning electron microscope;
determining a search space based on overlapping the image layout and the design layout in search units;
matching the image layout and the design layout in the search space to determine a matched image layout and a matched design layout, respectively; and
detecting defects in the matched image layout and the matched design layout,
wherein the determining the search space includes
calculating a quantity of first inferior patterns in which a pattern of the design layout fails to appear in the image layout and a quantity of second inferior patterns in which a pattern that is not present in the design layout appears in the image layout, and
determining the search space based on minimization of at least one of the quantity of the first inferior patterns in which the pattern of the design layout fails to appear in the image layout or the quantity of the second inferior patterns in which the pattern that is not present in the design layout appears in the image layout.

10. The method of claim 9, wherein the search units are determined based on a design rule of the design layout.

11. The method of claim 9, wherein the determining the search space comprises:
moving the design layout in the search units on the image layout.

12. The method of claim 9, wherein the matching the image layout and the design layout in the search space comprises matching the image layout and the design layout to maximize an area of an overlap in the search space of a pattern of the image layout and the pattern of the design layout.

13. The method of claim 9, wherein the converting the SEM image to the image layout comprises converting the SEM image to the image layout using a noise removal algorithm, a segmentation algorithm, and a contour tracing.

14. The method of claim 9, further comprising:
generating a prediction model based on performing machine learning using the SEM image, the design layout and the detected defects in the matched image layout and the matched design layout; and
receiving a target SEM image using the prediction model and detecting defects in the target SEM image based on processing the target SEM image using the prediction model.

15. The method of claim 9, wherein the detecting the defects in the matched image layout and the matched design layout comprises
detecting a first inferior pattern from within the first inferior patterns in which the pattern of the design layout fails to appear in the image layout and a second inferior pattern from within the second inferior patterns in which the pattern that is not present in the design layout appears in the image layout, in the matched image layout and the matched design layout as the defects in the matched image layout and the matched design layout.

16. A system, the system comprising:
a memory configured to store a program of instructions; and
a processor configured to execute the program of instructions to
convert an SEM image into an image layout, wherein the SEM image is an image obtained based on photographing a semiconductor pattern formed on a semiconductor wafer using a design layout based on using a scanning electron microscope,
determine a search space based on performing first layout matching for the image layout and the design layout,
match the image layout and the design layout in the search space to determine a matched image layout and a matched design layout, respectively, based on an area of an overlap of a pattern of the design layout and a pattern of the image layout, and
output defect information based on detecting defects in the matched image layout and the matched design layout,
wherein the processor is configured to execute the program of instructions to perform the first layout matching and determine the search space to minimize at least one of a quantity of first inferior patterns in which the pattern of the design layout fails to appear in the image layout or a quantity of second inferior patterns in which a pattern that is not present in the design layout appears in the image layout.

17. The system of claim 16, wherein the defect information indicates at least one of a presence or absence of the defects in the matched image layout and the matched design layout, a location of the defects in the matched image layout and the matched design layout, or a defect type of the defects in the matched image layout and the matched design layout.

* * * * *